United States Patent
Trivedi et al.

(10) Patent No.: US 11,859,138 B2
(45) Date of Patent: Jan. 2, 2024

(54) RENEWABLE DISTILLATE PRODUCTION WITH CONTINUOUS CATALYST SULFIDATION

(71) Applicant: EXXONMOBIL TECHNOLOGY AND ENGINEERING COMPANY, Annandale, NJ (US)

(72) Inventors: Kirtan K. Trivedi, Shenandoah, TX (US); Michael H. Ring, Conroe, TX (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 0 days.

(21) Appl. No.: 18/063,868

(22) Filed: Dec. 9, 2022

(65) Prior Publication Data

US 2023/0183581 A1 Jun. 15, 2023

Related U.S. Application Data

(60) Provisional application No. 63/265,303, filed on Dec. 13, 2021.

(51) Int. Cl.
*C10L 1/08* (2006.01)
*C10G 3/00* (2006.01)

(52) U.S. Cl.
CPC ............ *C10G 3/50* (2013.01); *C10L 1/08* (2013.01); *C10G 2300/1014* (2013.01);
(Continued)

(58) Field of Classification Search
CPC ............. C10G 3/50; C10G 2300/1014; C10G 2300/202; C10G 2400/04; C10G 2300/42;
(Continued)

(56) References Cited

U.S. PATENT DOCUMENTS 8,318,996 B2 11/2012 Murty et al.
9,822,048 B2 11/2017 Boon et al.
(Continued)

FOREIGN PATENT DOCUMENTS

WO 2013/148907 A1 10/2013
WO 2021/180808 A1 9/2021

OTHER PUBLICATIONS

International Search Report and Written Opinion received for PCT Patent Application No. PCT/US2022/081341, dated Mar. 27, 2023, 10 pages.

*Primary Examiner* — Prem C Singh
*Assistant Examiner* — Francis C Campanell
(74) *Attorney, Agent, or Firm* — Shook, Hardy & Bacon L.L.P.

(57) ABSTRACT

Systems and methods are provided for performing hydrodeoxygenation of bio-derived feeds while maintaining the hydrodeoxygenation catalyst in a sulfided state. During hydrodeoxygenation, a hydrogen-containing stream is provided to the hydrodeoxygenation reactor as a hydrogen treat gas to provide hydrogen for the reaction. In some aspects, the hydrogen treat gas used for hydrodeoxygenation can be formed at least in part from hydrogen that has been used as a stripping gas for removing $H_2S$ from a rich amine stream. In other aspects, $H_2S$ can be stripped using water vapor, and a resulting overhead HS stream can be compressed prior to incorporation of the $H_2S$ into a hydrogen-containing stream. The resulting hydrogen-containing stream can include sufficient $H_2S$ to substantially maintain the catalyst in the hydrodeoxygenation stage in a sulfided state.

20 Claims, 7 Drawing Sheets

(52) U.S. Cl.
CPC ............... *C10G 2300/202* (2013.01); *C10G 2300/4006* (2013.01); *C10G 2300/4012* (2013.01); *C10G 2400/04* (2013.01); *C10L 2200/0476* (2013.01); *C10L 2270/026* (2013.01)

(58) Field of Classification Search
CPC .... C10G 3/44; C10G 3/52; C10L 1/08; C10L 2200/0476; C10L 2270/026; B01D 53/1425; B01D 53/1468; B01D 53/52; B01D 53/73; B01D 53/78; B01D 2252/204; Y02P 30/20; B01J 37/20
USPC ....................................................... 585/240
See application file for complete search history.

(56) References Cited

U.S. PATENT DOCUMENTS

2008/0312480 A1* 12/2008 Dindi ..................... C10G 3/50
585/240
2014/0264164 A1    9/2014 Reynolds
2015/0094506 A1*  4/2015 Fichtl ................... C10G 65/043
422/187

\* cited by examiner

RENEWABLE DISTILLATE PRODUCTION WITH CONTINUOUS CATALYST SULFIDATION

FIELD

This invention relates to maintaining a sulfided catalyst during hydrodeoxygenation of renewable feeds to form renewable distillate boiling range products, such as renewable diesel.

BACKGROUND

One of the pathways to forming renewable fuels is to upgrade a bio-derived feedstock using hydroprocessing. This can pose a variety of challenges, based on the differences in composition for a bio-derived feedstock relative to a mineral feed. One of the compositional differences is that bio-derived feedstocks can often have a substantial oxygen content. One of the purposes of using hydroprocessing to upgrade a bio-derived feedstock is to remove such oxygen to a desired level.

A second compositional difference is that bio-derived feedstocks often also have a relatively low/no sulfur content. For example, vegetable oils such as canola oil or soybean oil can have substantial oxygen contents while being substantially sulfur-free. A low sulfur content has traditionally been advantage for mineral feeds, due to the ability to avoid the need for hydrotreatment of such low sulfur mineral feeds. However, when attempting to perform hydrodeoxygenation of a feed with a substantial oxygen content but a low sulfur content, the low sulfur content of the bio-derived feed can result in desulfidation of the catalyst used in the hydrodeoxygenation process. Desulfidation causes the catalyst to lose activity or performance over time. This loss of activity forces increases in reactor temperature and ultimately forces shorter cycles between catalyst changes.

One option for avoiding desulfidation of catalyst during a hydrodeoxygenation process can be based on use of a mineral feed that contains sulfur. For example, a mineral feed can be used as a co-feed, so that the combination of the mineral feed and the bio-derived feed has a sufficient sulfur content to maintain the catalyst in a sulfided state.

A variation on this can be to use an already hydroprocessed mineral fraction that still includes at least a portion of the $H_2S$ that was evolved during hydroprocessing. Such a feed can be used as a co-feed for a bio-derived fraction.

Still another variation is described in U.S. Pat. No. 8,318,996, where a hydroprocessed mineral stream that still includes $H_2S$, such as a naphtha, kerosene, or diesel stream, is used as a "sponge oil" for removing hydrocarbons such as propane from an $H_2$-containing stream. During contact of the $H_2$-containing stream with the sponge oil, hydrocarbons are removed from the $H_2$-containing stream while $H_2S$ is added. The $H_2$-containing stream with the added $H_2S$ can then be used as treat gas for a hydroprocessing of a bio-derived feed.

SUMMARY

In some aspects, a method for performing hydrodeoxygenation is provided. The method includes stripping an amine-containing flow including a first molar ratio of $H_2S$ to amine of 0.25 or more with a stripping gas comprising 80 vol % or more of $H_2$ in a vessel to form an amine-containing flow including a second molar ratio of $H_2S$ to amine that is lower than the first molar ratio and a gas phase fraction including 80 vol % or more $H_2$ and 50 vppm or more of $H_2S$. Additionally, the method includes exposing a feedstock including at least a fresh feed portion to a sulfided hydroprocessing catalyst and a treat gas including at least a portion of the gas phase fraction under hydrodeoxygenation conditions to form a liquid product effluent including 0.5 wt % or less of oxygen and a gas product effluent including 100 vppm or more of $H_2S$, the fresh feed portion including 1000 wppm or less of sulfur and 1.0 wt % or more of oxygen, the hydrodeoxygenation conditions including a flow of treat gas relative to a flow rate of the fresh feed of 5000 SCF/bbl or higher (~1350 $Nm^3/m^3$).

In some aspects, a method for performing hydrodeoxygenation is provided. The method includes stripping an amine-containing flow including a first molar ratio of $H_2S$ to amine of 0.25 or more with a stripping gas comprising steam in a vessel to form an amine-containing flow including a second molar ratio of $H_2S$ to amine that is lower than the first molar ratio and a gas phase fraction containing $H_2S$. The method further includes compressing at least a portion of the gas phase fraction containing $H_2S$ to form a compressed $H_2S$ fraction, the compressed $H_2S$ fraction including 1.0 vol % or more $H_2S$. Additionally, the method includes exposing a feedstock including at least a fresh feed portion to a sulfided hydroprocessing catalyst and a treat gas including at least a portion of the compressed $H_2S$ fraction under hydrodeoxygenation conditions to form a liquid product effluent including 0.5 wt % or less of oxygen and a gas product effluent including 100 vppm or more of $H_2S$, the fresh feed portion including 1.0 wt % or more of oxygen, the hydrodeoxygenation conditions including a flow of treat gas relative to a flow rate of the fresh feed of 5000 SCF/bbl or higher (~1350 $Nm^3/m^3$), the treat gas including 80 vol % or more of $H_2$ and 50 vppm or more of $H_2S$.

In some aspects, the fresh feed portion of the feedstock can include 1000 wppm or less of sulfur, or 300 wppm or less. For example, the fresh feed portion can correspond to a bio-derived fraction having an oxygen content of 1.0 wt % or more and a sulfur content of 1000 wppm or less.

Optionally, a method for performing hydrodeoxygenation can further include performing an initial sulfidation of the sulfided hydroprocessing catalyst. In such aspects, the method can include stripping an third amine-containing flow including a third molar ratio of $H_2S$ to amine of 0.25 or more with a stripping gas including 80 vol % or more of $H_2$ in a vessel to form an amine-containing flow including a fourth molar ratio of $H_2S$ to amine that is lower than the third molar ratio and a sulfidation gas phase fraction including 80 vol % or more $H_2$ and 1.0 vol. % or more of $H_2S$. In such aspects, the method can further include exposing a hydroprocessing catalyst to sulfidation treat gas including at least a portion of the sulfidation gas phase fraction under sulfidation conditions to form the sulfided hydroprocessing catalyst.

DETAILED DESCRIPTION

Figure 1:
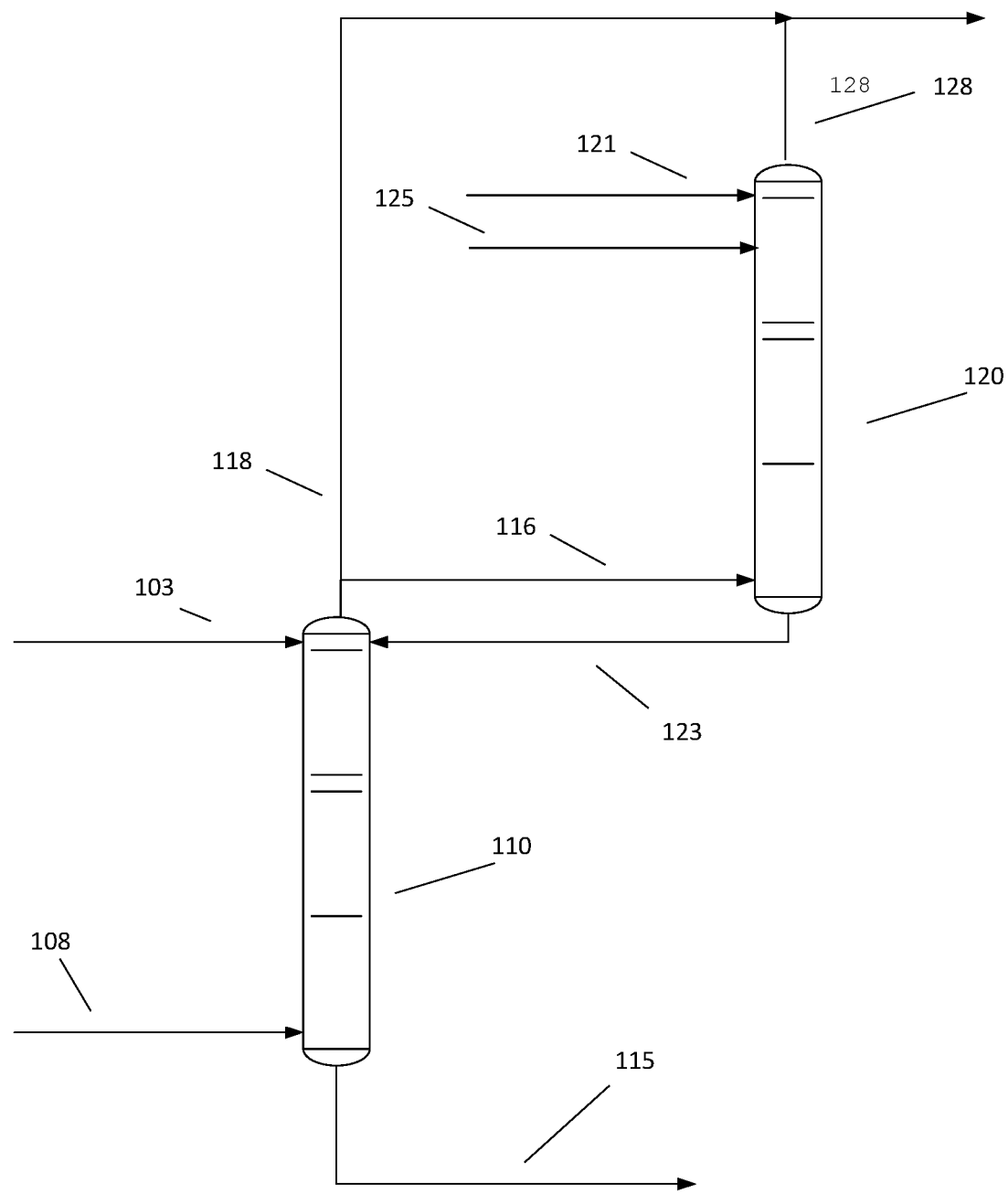
FIG. 1 shows an example of a configuration for forming a hydrogen-containing gas that includes $H_2S$ by stripping a rich amine stream with a hydrogen-containing stream.

All numerical values within the detailed description and the claims herein are modified by "about" or "approximately" the indicated value, and take into account experimental error and variations that would be expected by a person having ordinary skill in the art.

Overview

In various aspects, systems and methods are provided for performing hydrodeoxygenation of bio-derived feeds in a variety of settings, such as in a refinery setting or in a standalone plant, while maintaining the hydrodeoxygenation catalyst in a sulfided state. During hydrodeoxygenation, a hydrogen-containing stream is provided to the hydrodeoxygenation reactor as a hydrogen treat gas to provide hydrogen for the reaction. In some aspects, the hydrogen treat gas used for hydrodeoxygenation can be formed at least in part from hydrogen that has been used as a stripping gas for removing $H_2S$ from a rich amine stream. In such aspects, the hydrogen recycle loop for the hydroprocessing stage(s) that include the hydrodeoxygenation stage can be integrated with the amine absorber loop for one or more associated processes. In other aspects, $H_2S$ can be stripped using water vapor, and a resulting overhead $H_2S$ stream can be compressed prior to incorporation of the $H_2S$ into a hydrogen-containing stream. The rich amine stream can correspond to a rich amine stream from an amine absorber associated with an individual processing unit, such as a hydroprocessing reactor, or a rich amine stream from a centralized unit that performs amine capture of $H_2S$ from gases derived from multiple refinery processes. The resulting hydrogen-containing stream can include sufficient $H_2S$ to substantially maintain the catalyst in the hydrodeoxygenation stage in a sulfided state.

Bio-derived fuels are a potential supplement or even alternative to conventional fuels. In order to be used in conventional fuel applications, however, bio-derived fuels typically need to be deoxygenated. While co-processing of substantial portions of mineral feeds (and or other non-bio-derived feeds) can be performed during hydrodeoxygenation, unless the mineral co-feed has no overlap in boiling range with the bio-derived feed, the resulting deoxygenated product corresponds to a mixture of bio-derived and non-bio-derived components. Increased flexibility can be achieved by performing hydrodeoxygenation on feedstreams that contain a reduced or minimized content of mineral petroleum, which can include processing substantially only bio-derived fractions in a hydrodeoxygenation process. This can allow for formation of a deoxygenated product that still corresponds to a substantially bio-derived fraction.

Hydrodeoxygenation is a type of hydroprocessing. Generally, many types of hydrodeoxygenation catalysts can be similar in composition to hydrotreatment catalysts, although catalysts with activity for aromatic saturation, hydrocracking, and/or catalytic dewaxing can often also have activity for hydrodeoxygenation. As an example, hydrotreatment catalysts typically correspond to one or more types catalytic metals supported on an oxide support or other type of support. For such hydrotreatment catalysts, the catalytic metal can typically be present in one of two forms—an oxide form and a sulfided form. The oxide form of the metal is the stable phase of the metal in the presence of oxygen. However, the sulfide form of the metal is the form that actually provides catalytic activity for hydroprocessing.

During hydroprocessing of conventional feeds, the sulfur content of the fresh portion of the feed can be sufficiently high (relative to the flow rates in the hydroprocessing reactor) and/or the oxygen content of the feed can be sufficiently low so that the catalyst remains in a sulfided state. In order to maintain a catalyst in a sulfided state, one option can be to maintain an $H_2S$ concentration in the gas phase portion of the hydroprocessing effluent can be roughly 100 vppm (volume parts per million) or more, such as up to 20,000 vppm. When the $H_2S$ concentration in the hydroprocessing effluent is roughly 100 vppm or higher, or 200 vppm or higher, or 300 vppm or higher, such as up to 20,000 vppm, this indicates that sufficient $H_2S$ is present in the reaction environment to substantially maintain catalysts in a sulfided state. This sulfided state can be maintained even though water is present in the reaction environment due to hydrodeoxygenation of a bio-derived feed. However, when the $H_2S$ concentration drops below roughly 100 vppm while water is also present in the reaction environment, the equilibrium for the metals on the catalyst can be driven toward converting the metals to an oxidized state.

Maintaining a gas phase concentration of $H_2S$ of roughly 100 vppm or higher (such as up to 20,000 vppm) can be dependent on several factors. Some factors can be related to the sulfur content of the feedstock that is being hydroprocessed as well as the severity of the hydroprocessing conditions. As organic sulfur is removed from a feed, the sulfur is converted to $H_2S$ under hydroprocessing conditions. If a feed has a relatively low sulfur content, little or no $H_2S$ can be generated regardless of reaction severity. On the other hand, with a relatively high sulfur content, conditions corresponding to a low percentage of desulfurization for a feed can still result in substantial formation of $H_2S$.

Other factors can be related to the flow rates within the hydroprocessing reactor. The $H_2S$ formed during desulfurization corresponds to a relatively small portion of the total gases within a hydroprocessing environment. Additionally, the gases within the hydroprocessing environment are continuously being replaced, based on the rate of addition of the hydrogen-containing treat gas into the hydroprocessing environment. Thus, as $H_2S$ is formed in the hydroprocessing environment at a rate that is proportional to the flow rate of liquid feed into the environment, $H_2S$ is removed at a rate that is proportional to the flow rate of treat gas into the environment. (Of course, based on mass balance considerations, the flow rate of liquids and gases into the hydroprocessing environment is roughly the same as the flow rate of liquids and gases out of the hydroprocessing environment.)

In some aspects, the potential for a hydroprocessing environment to have an $H_2S$ content that is too low to maintain a catalyst in a sulfided state can be at least partially identified based on the sulfur content of the fresh feed into the environment. In this discussion, the fresh feed introduced into the hydroprocessing environment corresponds to feedstock that has not been recycled from a location downstream of the hydroprocessing reactor. In other words, any portion of a feedstock that corresponds to a recycled portion of the hydroprocessing effluent is considered recycled feed, and therefore is excluded from the definition of fresh feed. In various aspects, fresh feed includes both fresh bio-derived feed and fresh mineral feed. It is noted that both the fresh bio-derived feed and the fresh mineral feed can correspond to feedstock that has been processed in other reaction vessels prior to introduction to the hydroprocessing environment. For example, at least a portion of the fresh mineral feed can correspond to a cycle oil from a fluid catalytic cracking process, a product from a coker or other thermal cracking process, or another type of previously processed feedstock. Additionally or alternately, a fresh mineral feed can include at least a portion formed by distillation of a whole crude, partial crude, or crude oil fraction. With regard to fresh bio-derived feed, it is typical for raw biomass to undergo at least some processing, in order to form a liquid bio-derived feed that is suitable for introduction into a hydroprocessing reactor.

When hydrodeoxygenating a bio-derived fraction either alone, with other co-feed(s) having a reduced or minimized sulfur content, and/or with a reduced or minimized amount of sulfur-containing mineral co-feed(s), the sulfur content of the fresh feed for hydrodeoxygenation can be 2000 wppm or less, or 1000 wppm or less, or 500 wppm or less, or 300 wppm or less, or 10 wppm or less, such as down to having substantially no sulfur content within detection limit (roughly 0 wppm). This sulfur content represents a weighted average of the sulfur contents of the various types of fresh feed included in the feedstock for hydroprocessing. It is noted that many types of bio-derived feeds can have sulfur contents of 50 wppm or less, including potentially having no sulfur content at all (i.e., sulfur content of 0 wppm). Thus, a feedstock could include a small portion of a relatively high sulfur content mineral fresh feed, or a more substantial portion of a lower sulfur content mineral fresh feed, while still having a weighted average sulfur content for the fresh feed of 2000 wppm or less, or 1000 wppm or less. Such feeds can often also have oxygen contents of substantially more than 1.0 wt %, such as 1.0 wt % to 20 wt %. For such feeds having substantial oxygen contents while having reduced or minimized sulfur content, the sulfided metals on the catalyst for hydrodeoxygenation can potentially be converted back into oxide form, thus reducing the activity of the catalyst.

The above difficulties can be reduced or minimized by using an improved method to form a hydrogen-containing stream that also includes sufficient $H_2S$ to maintain a hydrodeoxygenation catalyst in a sulfided state. In various aspects, a hydrogen-containing stream that also contains $H_2S$ can be formed by using $H_2S$ from a rich amine stream derived from another location and/or reaction system. Optionally, the $H_2S$ can be added to the hydrogen-containing stream by using at least a portion of the hydrogen-containing stream as a stripping gas for separating the $H_2S$ from the rich amine. The resulting stripping gas containing both hydrogen and $H_2S$ can then be used as at least a portion of the hydrogen treat gas for hydrodeoxygenation of a bio-derived feedstock. In various aspects, incorporating $H_2S$ into the hydrogen treat gas can correspond to including 50 vppm to 10,000 vppm of $H_2S$ (or 100 vppm to 10,000 vppm, or 200 vppm to 10,000 vppm, or 1000 vppm to 10,000 vppm, or 50 vppm to 1000 vppm, or 100 vppm to 1000 vppm, or 200 vppm to 1000 vppm) in the hydrogen treat gas and/or the target value of desired sulfur to keep the catalyst in sulfided state.

Because bio-derived feeds often have a relatively low sulfur content, the gas product portion of the effluent from hydrodeoxygenation can have a relatively low content of $H_2S$. As a result, passing the gas product portion of a hydrodeoxygenation effluent through an amine absorber can tend to result in a $CO_2$-enriched rich amine stream, where the molar ratio of $H_2S$ to amine is less than 0.25 while the molar ratio of $CO_2$ to amine is 0.20 or more. By contrast, in various aspects, the $H_2S$ for incorporation into a hydrogen treat gas can be derived from a rich amine stream that has a molar ratio of $H_2S$ to amine of 0.25 or more.

In some aspects, incorporating $H_2S$ into the hydrogen treat gas can be accomplished by using a hydrogen-containing ($H_2$) stream as a stripping gas for separating $H_2S$ from a rich amine stream. In such aspects, one potential source for a hydrogen-containing stream can be hydrogen recycled from the hydroprocessing of the bio-derived feed. This type of recycled hydrogen-containing stream can include $CO_2$. Lean amine is used to absorb the CO2 in the recycle stream. The hydrogen-stream after contacting with the lean amine stream is then used as the medium for stripping the rich amine stream. In such aspects, using a recycled hydrogen-containing stream as part of the stripping gas can have the additional advantage of reducing or minimizing the $CO_2$ content of the stripping gas, while also adding $H_2S$ to the hydrogen-containing stream. This reduction in $CO_2$ content can reduce or minimize the amount of hydrogen purge that is needed in order to avoid build-up of $CO_2$ in the hydrogen recycle loop for the hydroprocessing reactor.

In various aspects, incorporating $H_2S$ derived from a rich amine stream into the hydrogen treat gas can provide advantages over other methods for maintaining a hydroprocessing catalyst in a sulfided state. For example, one alternative option for introducing sulfur into a reaction system can be to use a sour hydrogen stream corresponding to the gas phase output from a hydrotreating reactor. During hydroprocessing, the hydrogen introduced into a reactor is typically provided in large excess relative to the stoichiometric need for performing the hydroprocessing. As a result, the gas phase effluent from a hydrotreatment stage can include sufficient hydrogen for hydrodeoxygenation while also including $H_2S$ generated during the hydrotreatment. However, such streams exiting from a hydrotreatment reactor also typically include other contaminants, such as $NH_3$, that can be detrimental to catalyst performance.

Another potential alternative for maintaining a catalyst in a sulfided state is to add a sulfur-containing agent to the feedstock. This type of strategy is used at catalyst startup for certain types of hydroprocessing catalysts are initially loaded into a reactor in metal oxide form. Examples of sulfur-containing agents include dimethyl disulfide (DMDS) or di-t-butyl polysulfide. Adding sulfur-containing agents to a feedstock can be effective for converting metal oxides on a catalyst into a sulfide form and/or maintaining a catalyst in a sulfide form. However, these types of components for adding sulfur to a feed can also present difficulties. For example, DMDS has a bad odor, a low flash point, and generally requires special handling. These issues are often managed on a temporary basis when using DMDS as part of the start-up procedure for a reactor. However, using DMDS long-term to maintain a catalyst in a sulfided state would likely require additional equipment to manage handling of the DMDS and to mitigate the odor. As another example, di-t-butyl polysulfide has low odor and is generally easier to handle than DMDS. However, di-t-butyl polysulfide can cause sulfur precipitation and/or line plugging within a reaction system.

In some aspects, the methods described herein for adding $H_2S$ from a rich amine stream to a hydrogen-containing gas flow can be used to provide sulfur for a catalyst sulfidation procedure. In such aspects, incorporating $H_2S$ into the hydrogen treat gas can correspond to including 1.0 vol % to 10.0 vol % of $H_2S$ in the hydrogen treat gas and/or the target value of desired sulfur to achieve a sulfided state for a catalyst.

Definitions

In this discussion a "liquid product effluent" from a hydroprocessing reaction is defined as the portion of a hydroprocessing effluent that would be a liquid at 20° C.; and 100 kPa-a. In this discussion, a "gas product effluent" from a hydroprocessing reaction is defined as the portion of a hydroprocessing effluent that would be a gas at 20° C. and 100 kPa-a. It is noted that hydroprocessing is typically performed at temperatures substantially above 20° C., so that the "liquid product effluent" may be at least partially in the gas phase when formed.

In this discussion, the sulfur content of a fraction can be determined according to ASTM D2622. The nitrogen content of a fraction can be determined according to ASTM D4629. The olefin content of a fraction can be determined by NMR. The oxygen content of a fraction can be determined by reductive pyrolysis.

In this discussion, a non-hydrotreated feed or other fraction corresponds to a feed or other fraction that has not been exposed to 50 psia (~345 kPa-a) or more of $H_2$ in the presence of a catalyst.

References to a periodic table, such as references to the Group number of a metal, are defined herein as references to the current version of the IUPAC periodic table.

Forming $H_2S$-enriched Hydrogen-Containing Stream

After addition of $H_2S$ to a hydrogen-containing stream, the resulting hydrogen-containing stream containing both hydrogen and $H_2S$ can include 50 vppm to 10,000 vppm of $H_2S$, or 50 vppm to 3000 vppm, or 50 vppm to 1000 vppm, or 200 vppm to 10,000 vppm, or 200 vppm to 3000 vppm, or 200 vppm to 1000 vppm. In such aspects, the hydrogen content of the hydrogen-containing stream can be 75 vol % or more, or 80 vol % or more, or 85 vol % or more, or 90 vol % or more, such as up to 99.95 vol %.

In some aspects, a rich amine stream can be heated prior to and/or during stripping in order to facilitate stripping of $H_2S$ from the amine stream. In other aspects, the stripping can be perthrmed at temperatures associated with the rich amine stream and/or the stripping stream without separate addition of heat. In various aspects, the temperature of the rich amine stream during contacting with a stripping medium for stripping of $H_2S$ can be 20° C. to 180° C., or 65° C. to 180° C., or 90° C. to 180° C., or 120° C. to 180° C., or 135° C. to 180° C., or 20° C. to 150° C., or 65° C. to 150° C., or 90° C. to 150° C., or 20° C. to 100° C. Optionally, the temperature of the rich amine stream during stripping to strip $H_2S$ can be varied based on a desired or target amount of $H_2S$ stripping. In such optional aspects, higher temperatures for the rich amine stream can allow for increased transfer of $H_2S$ into the stripping gas, while lower temperatures can reduce the transfer of $H_2S$ into the stripping gas. The stripping can be performed at a convenient pressure. In some aspects, the stripping can be performed at a pressure corresponding to a pressure that is used for forming the rich amine stream. In other aspects, the stripping can be performed at an elevated pressure, so that the resulting stripping gas plus $H_2S$ is at a pressure that can be introduced into a reactor. Depending on the aspect, the pressure during stripping can be 0.7 MPa-a to 8.0 MPa-a, or 1.4 MPa-a to 8.0 MPa-a, or 4.0 MPa-a to 8.0 MPa-a, or 0.7 MPa-a to 4.0 MPa-a, or 1.4 MPa-a to 4.0 MPa-a.

In some aspects, stripping of a rich amine stream can be performed using steam. In such aspects, an $H_2S$-containing stream can be formed from the overhead gas of a stripping tower. The $H_2S$-containing stream can be compressed and then combined with a hydrogen-containing stream for use as at least a portion of a hydrogen treat gas for a hydroprocessing stage that performs hydrodeoxygenation. In other aspects, hydrogen can be used as the stripping gas for stripping a rich amine stream to form a hydrogen-containing stream that is enriched in $H_2S$. In such aspects, prior to stripping, the hydrogen-containing stream used as the stripping gas can in have an $H_2S$ content of 0.10 vol % or less, or 0.05 vol % or less, or 0.02 vol % or less, such as down to having substantially no $H_2S$ content (0.01 vol % or less).

A rich amine stream can generally be composed of mostly water. The $H_2S$ content of a rich amine stream can be defined based on the molar ratio of $H_2S$ to amine in the amine stream. It is noted that some $H_2S$ may remain with the amine stream after stripping. For example, a rich amine stream that contains $H_2S$ can have a molar ratio of $H_2S$ to amine of 0.25 or more, or 0.30 or more, such as up to 1.0.

In various aspects, any convenient type of amine conventionally used in an acid gas absorber system can be used for a rich amine stream or lean amine stream. Examples of amines can include, but are not limited to, monoethanolamine (MEA), diethanolamine (DEA), methyldiethanolamine (MDEA), and diisopropanolamine (DTPA). Still another example is to use Flexsorb™, which corresponds to a mixture of sterically hindered amines. More generally, any amine (or combination of amines) that is suitable for use in an amine absorber can be used.

Configuration Examples

In some aspects, a hydrogen-containing stream can be used as a stripping gas for removing $H_2S$ from a rich amine stream. After use as a stripping gas, the hydrogen-containing stream, now enriched in $H_2S$, can then be used as at least a portion of a hydrogen treat gas for hydrodeoxygenation of a feed including a bio-derived fraction. Optionally, additional hydrogen can be added to the hydrogen treat gas.

FIG. 1 shows an example of a configuration for using a hydrogen-containing stream as a stripping gas for a rich amine stream. The configuration in FIG. 1 corresponds to a two-stage configuration for integrating amine stripping with a hydrogen recycle loop. In the configuration shown in FIG. 1, the first stage of the system corresponds to an acid gas adsorber vessel 110 for treatment of a sour hydrogen-containing stream 108.

The sour hydrogen-containing stream 108 can correspond to any convenient type of hydrogen-containing stream that would be passed into a hydrogen recycle loop. In some aspects, the sour hydrogen-containing stream can correspond to a sour hydrogen-containing stream generated from the hydroprocessing stage that performs the hydrodeoxygenation of the bio-derived feed. In other aspects, the sour hydrogen-containing stream can correspond to a stream generated from any other convenient type of hydroprocessing stage. In still other aspects, the sour hydrogen-containing stream can correspond to a mixture of streams from various refinery processes.

As an example, after performing hydroprocessing, separation(s) are usually performed to separate desired liquid products (i.e., products that are liquid at 20° C. and 100 kPa-a) from lower boiling products. Because hydroprocessing is often performed using a substantial excess of hydrogen in the treat gas, the lower boiling products can include a substantial amount of hydrogen. Additionally, the lower boiling products can include one or more types of contaminant gases (such as $CO_2$, $H_2S$, and/or $NH_3$), as well as some $C_{4-}$ hydrocarbons. Due to the presence of the contaminant gases mixed with a substantial amount of hydrogen, such a stream of lower boiling products can be referred to as a sour hydrogen-containing stream. As an example, one option for separating liquid products from lower boiling products can be to use one or more gas-liquid separators that operate at different temperatures and/or pressures. Liquid products can be separated from lower boiling components, for example, in a low temperature, high pressure separator, although various combinations of separators at various temperatures and/or pressures could be used to generate such a stream including lower boiling components.

In the example shown in FIG. 1, the sour hydrogen-containing stream 108 is introduced into acid gas adsorber vessel 110 along with a lean amine stream 123 and an optional additional lean amine stream 103 (containing 0.10 vol % or less of $H_2S$). In the configuration shown in FIG. 1, the sour hydrogen-containing stream and the lean amine stream 103 are contacted in a counter-current manner. This can allow for adsorption of one or more contaminants from the sour hydrogen-containing stream 108. This results in formation of a rich amine stream 115 and an overhead stream 118 that contains hydrogen with a reduced or minimized content of contaminants. As a result, the overhead stream 118 corresponds to a sweet hydrogen-containing stream.

A portion 116 of overhead stream 118 (which corresponds to a sweet hydrogen stream) can then be used as a stripping gas for an amine stripper 120. In the example of an amine stripper 120 shown in FIG. 1, a rich amine stream 125 can be contacted in a counter-current manner with the hydrogen-containing stripping gas formed from portion 116 of overhead stream 118. Optionally, the rich amine stream 125 can be heated (not shown) prior to contact with the hydrogen-containing stripping gas. This results in formation of the lean amine stream 123 and an overhead stream 128 that contains hydrogen enriched in $H_2S$. The overhead stream 128 can be combined with the remainder (if any) of overhead stream 118 and then passed to a compressor (not shown) for use as at least a portion of the hydrogen treat gas for a hydrodeoxygenation process. To further assist with reducing or minimizing an entrainment of amine in the overhead stream 128, and/or to assist with removal of any $NH_3$ that may have been present in the sow hydrogen-containing stream 108, an optional water wash 121 can be added near the top of stripper 120.

Figure 2:
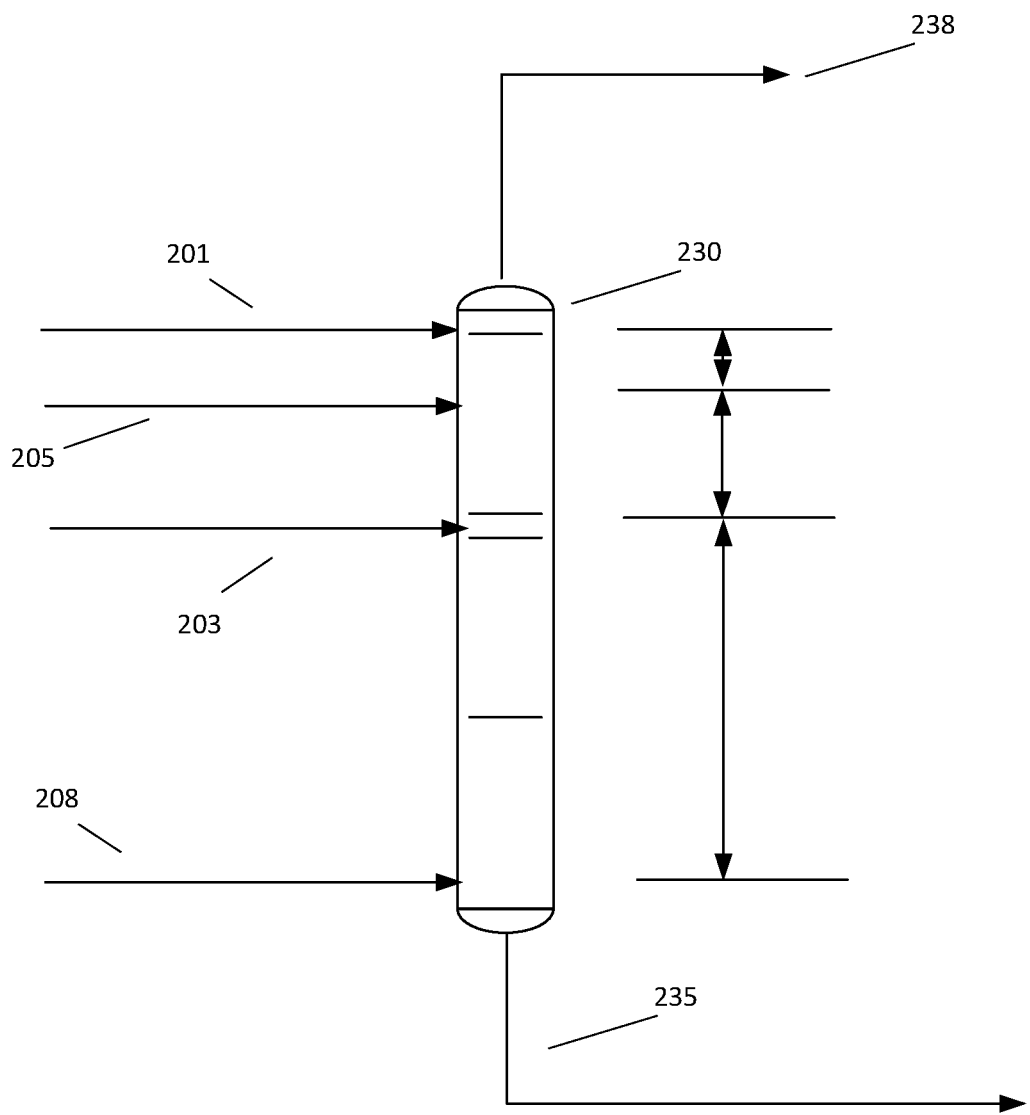
FIG. 2 shows another example of a configuration for brining a hydrogen-containing gas that includes $H_2S$ by stripping a rich amine stream with a hydrogen-containing stream.

In the configuration example shown in FIG. 1, acid gas adsorber vessel 110 and amine stripper 120 correspond to separate vessels. FIG. 2 shows a type of configuration where the sour gas treatment and amine regeneration can be performed in a single vessel.

In FIG. 2, vessel 230 is used to perform the functions of both an acid gas adsorber and an amine stripper. In this type of configuration, vessel 230 receives four separate inputs. The inputs include a sour hydrogen-containing stream 208, a lean amine stream 203, a rich amine stream (that contains absorbed $H_2S$) 205, and a water wash 201. In the configuration shown in FIG. 2, the rich amine stream 205 at a location in the vessel 230 above the lean amine stream 203. As sour hydrogen-containing stream 208 travels up in vessel 230, the sour hydrogen-containing stream first contacts lean amine stream 203. This allows for removal of at least a portion of any contaminants from the sour hydrogen-containing stream 208. The hydrogen-containing stream can then contact the rich amine stream 205, where $H_2S$ is transferred from the rich amine stream 205 to the hydrogen-containing stream. Optionally, the rich amine stream 205 can be heated (not shown) prior to contact with the hydrogen-containing stripping gas. This results in formation of an overhead stream 238 that corresponds to hydrogen enriched in $H_2S$, as well as a rich amine stream 235 that contains $CO_2$ removed from the sour hydrogen-containing stream 208. The (optional) water wash 201 can be used to reduce or minimize the potential for amine to be entrained in overhead stream 238. The overhead stream can then be sent to a compressor for use as at least a portion of the hydrogen treat gas for a hydrodeoxygenation process.

Figure 3:
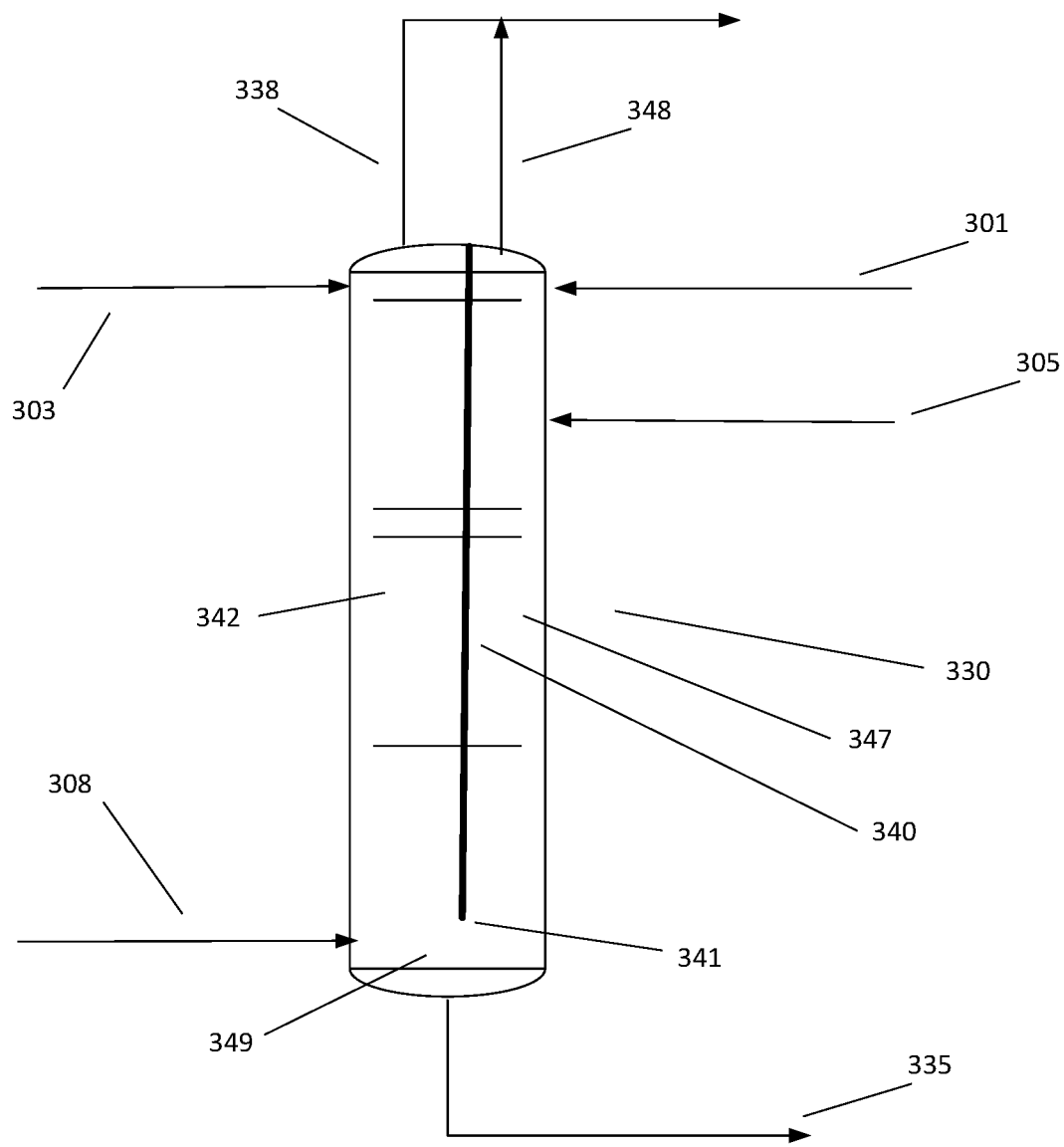
FIG. 3 shows an example of a configuration for forming a hydrogen-containing gas that includes $H_2S$ by stripping a rich amine stream with a hydrogen-containing stream where the stripping vessel includes a top dividing wall.

Another option for using a single vessel for both acid gas treatment and amine stripping is to use a vessel that includes a dividing wall. FIG. 3 shows an example of a configuration where a top dividing wall is included in the vessel, but the dividing wall extends for less than the full height of the vessel.

In FIG. 3, dividing wall 340 is used to separate the vessel 330 into at least two regions. Dividing wall 340 can divide vessel 330 in any convenient manner. In the example shown in FIG. 3, dividing wall 340 divides the upper portion of vessel 330 into two separate regions. A first region 342 corresponds to a portion of the vessel 330 that serves as an acid gas adsorber. A second region 347 corresponds to a portion of the vessel 330 that serves as an amine stripper. Because dividing wall 340 does not match the full height of the vessel 330, there is also a third common region 349 that is in fluid communication with both first region 342 and second region 347.

In a configuration such as the example shown in FIG. 3, sour hydrogen stream 308 can be passed into vessel 330 at a location that is below the level of the bottom 341 of dividing wall 340. This can allow portions of sour hydrogen stream 308 to enter both first region 342 and second region 347. In the example shown in FIG. 3, a greater portion of the sour hydrogen stream 308 can enter into first region 342.

During operation, portions of sour hydrogen stream 308 can travel upward on both sides of dividing wall 340. In first region 342, a portion of sour hydrogen stream 308 is contacted with lean amine stream 303. This results in formation of a sweet hydrogen stream as a first overhead stream 338. Rich amine containing adsorbed contaminants from the sour hydrogen stream 308 is also formed. In second region 347, another portion of sour hydrogen stream 308 is contacted with a rich amine stream 305 that contains $H_2S$. This results in formation of a second overhead stream 348 that is enriched in $H_2S$. Optionally, the rich amine stream 305 can be heated (not shown) prior to contact with the sour hydrogen stream 308. A second rich amine stream containing adsorbed $CO_2$ is also formed. The rich amine streams containing adsorbed $CO_2$ can exit the vessel 330 as a combined rich amine stream 335. The first overhead stream 338 and second overhead stream 348 can be combined and passed to a compressor for use as at least a portion of a hydrogen treat gas for hydrodeoxygenation. A water wash 301 can be included in second region 347. A water wash can also be included in the 342 region (not shown).

Figure 4:
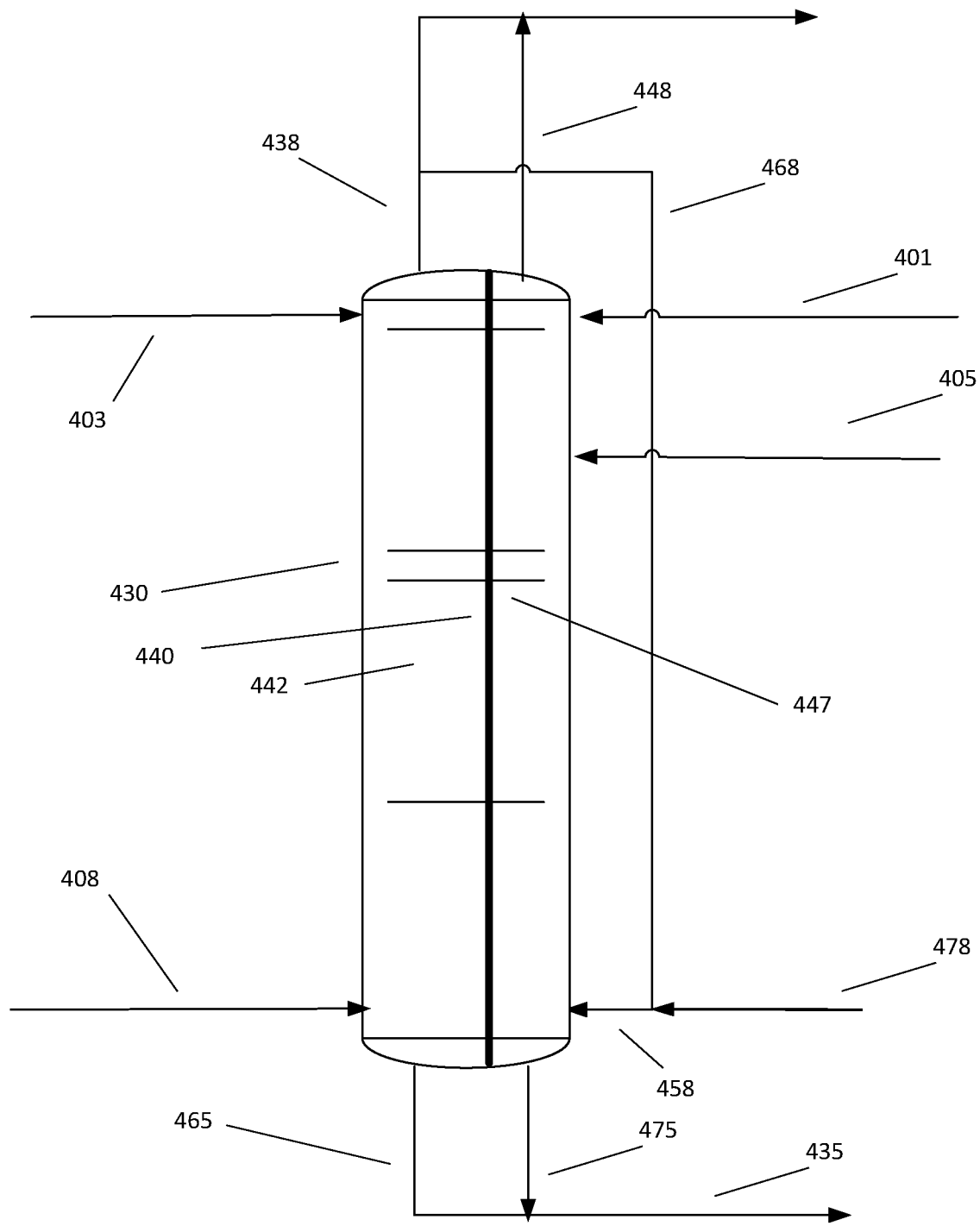
FIG. 4 shows another example of a configuration for forming a hydrogen-containing gas that includes $H_2S$ by stripping a rich amine stream with a hydrogen-containing stream where the stripping vessel includes a full dividing wall.

In the example shown in FIG. 3, the height of the dividing wall column 340 is less than the interior height of vessel 330, so that a common volume 349 provides fluid communication between first region 342 and second region 347. In FIG. 4, still another type of configuration is shown where a dividing wall column 440 is used that matches the full interior height of the vessel 430. In FIG. 4, dividing wall 440 divides the interior of vessel 430 into a first region 442 and a second region 447. However, because dividing wall 440 matches the full interior height of vessel 430, there is substantially no fluid communication between first region 442 and second region 447.

Some of the input and flows in FIG. 4 can be similar to the input flows in FIG. 3. Thus, sour hydrogen-containing stream 408, lean amine stream 403, rich amine stream 405, and water wash 401 in FIG. 4 can be similar to sour hydrogen-containing stream 308, lean amine stream 303, rich amine stream 305, and water wash 301 in in FIG. 3. Stream 405 can be optionally heated (not shown in FIG. 4). Additionally, overhead stream 438 and overhead stream 448 can be combined for subsequent compression and use as at least a part of the hydrogen treat gas for a hydrodeoxygenation process. However, because dividing wall 440 extends for the full height of the interior of vessel 430, there are some differences. First, a separate hydrogen-containing stream 458 is introduced into second region 447 in FIG. 4. FIG. 4 shows two examples of how the separate hydrogen-containing stream 458 can be provided. One option can be to use a portion 468 of overhead stream 438. Another option can be to use a sweet or sour hydrogen-containing stream 478 generated by the hydroprocessing stage that performs the hydrodeoxygenation or hydroisomerization or a pure hydrogen stream. In this type of aspect, sour hydrogen-containing stream 408 can be from a different source than sour hydrogen-containing stream 478. Additionally, in the configuration shown in FIG. 4, separate rich amine streams 465 and 475 can be formed. Optionally, these streams can be combined to form a combined rich amine stream 435.

Figure 5:
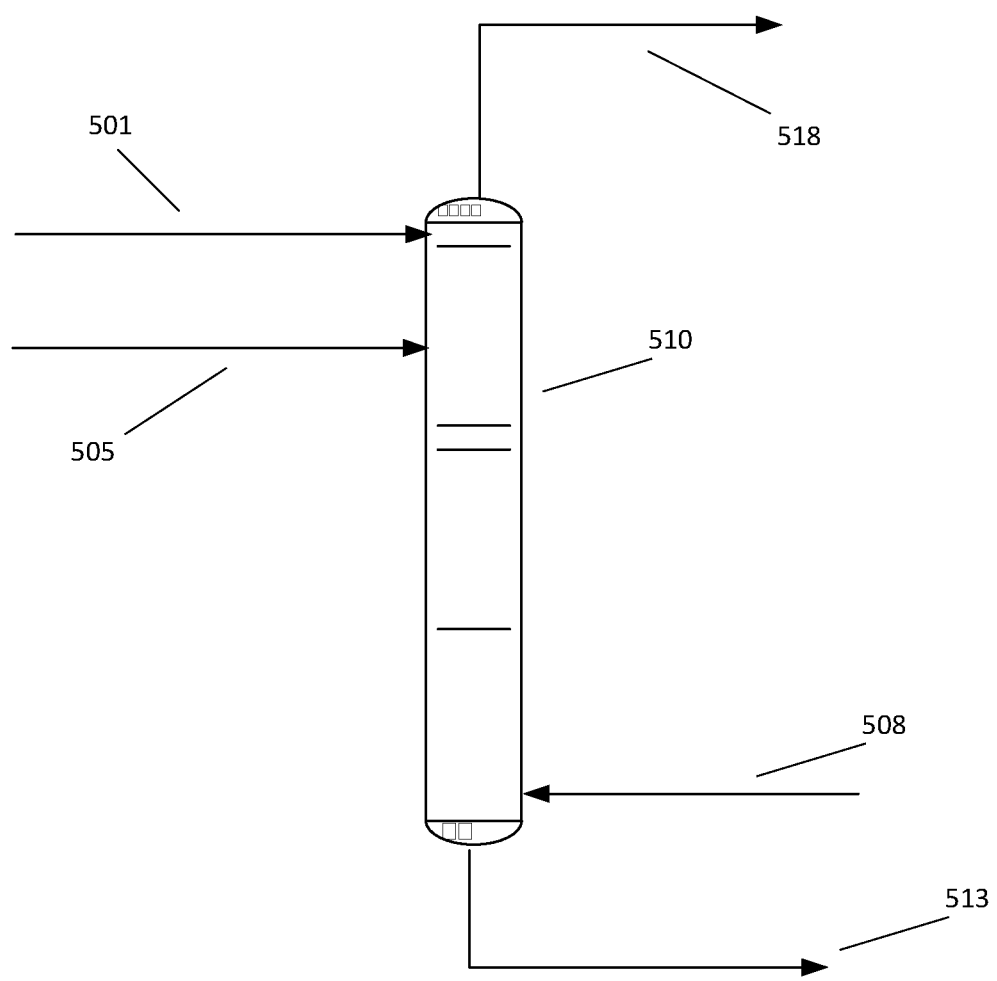
FIG. 5 shows another example of a configuration for forming a hydrogen-containing gas that includes $H_2S$ by stripping a rich amine stream with a hydrogen-containing stream.

In the configurations shown in FIGS. 1-4, the configurations correspond to flow schemes that can be used to generate a hydrogen stream that would need subsequent compression prior to use as a hydrogen treat gas. In other aspects, compression of the hydrogen can be performed prior to enriching the hydrogen treat gas with $H_2S$. FIG. 5 shows an example of a configuration for forming an $H_2S$-enriched hydrogen-containing stream after compression of the stream to the target pressure for use in hydroprocessing.

In the example shown in FIG. 5, hydrogen stream 508 is introduced into amine stripper 510. Hydrogen stream 508 can correspond to fresh or make-up hydrogen, or can correspond to hydrogen that has already been sweetened and then compressed in a recycle loop. The hydrogen stream 508 is used to at least partially strip a rich amine 505 that includes $H_2S$. Optionally, the rich amine stream 505 can be heated (not shown) prior to contact with the hydrogen stream 508. This produces a lean amine 513 that can be sent to an amine absorber (such as a sour hydrogen stream adsorber) for further use. This also results in an overhead stream 518 that includes hydrogen and $H_2S$. A water wash 501 can optionally also be included to reduce or minimize entrainment of amines in the overhead stream 518.

Figure 6:
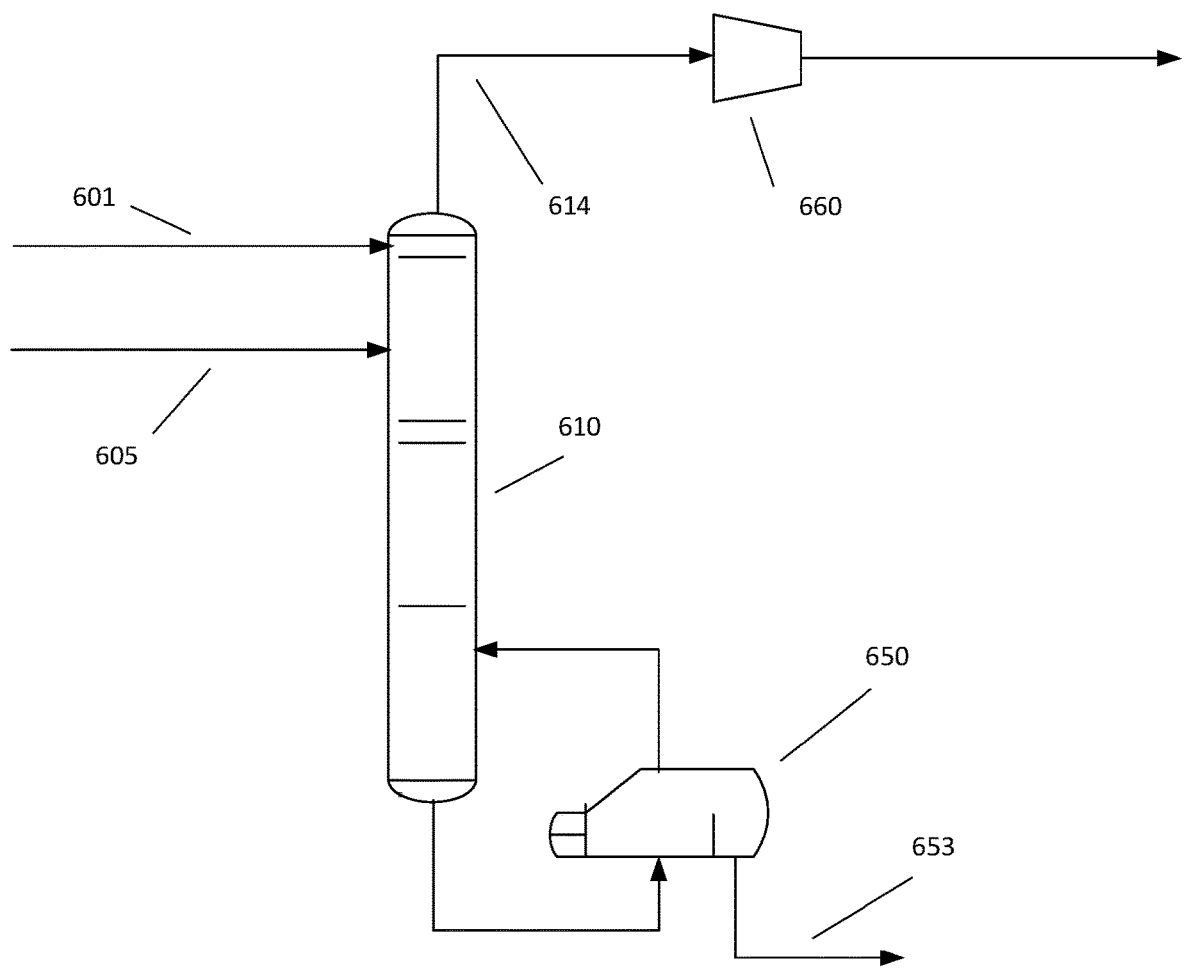
FIG. 6 shows an example of a configuration for forming a compressed $H_2S$ stream from the overhead gas of an amine stripping vessel.
Figure 7:
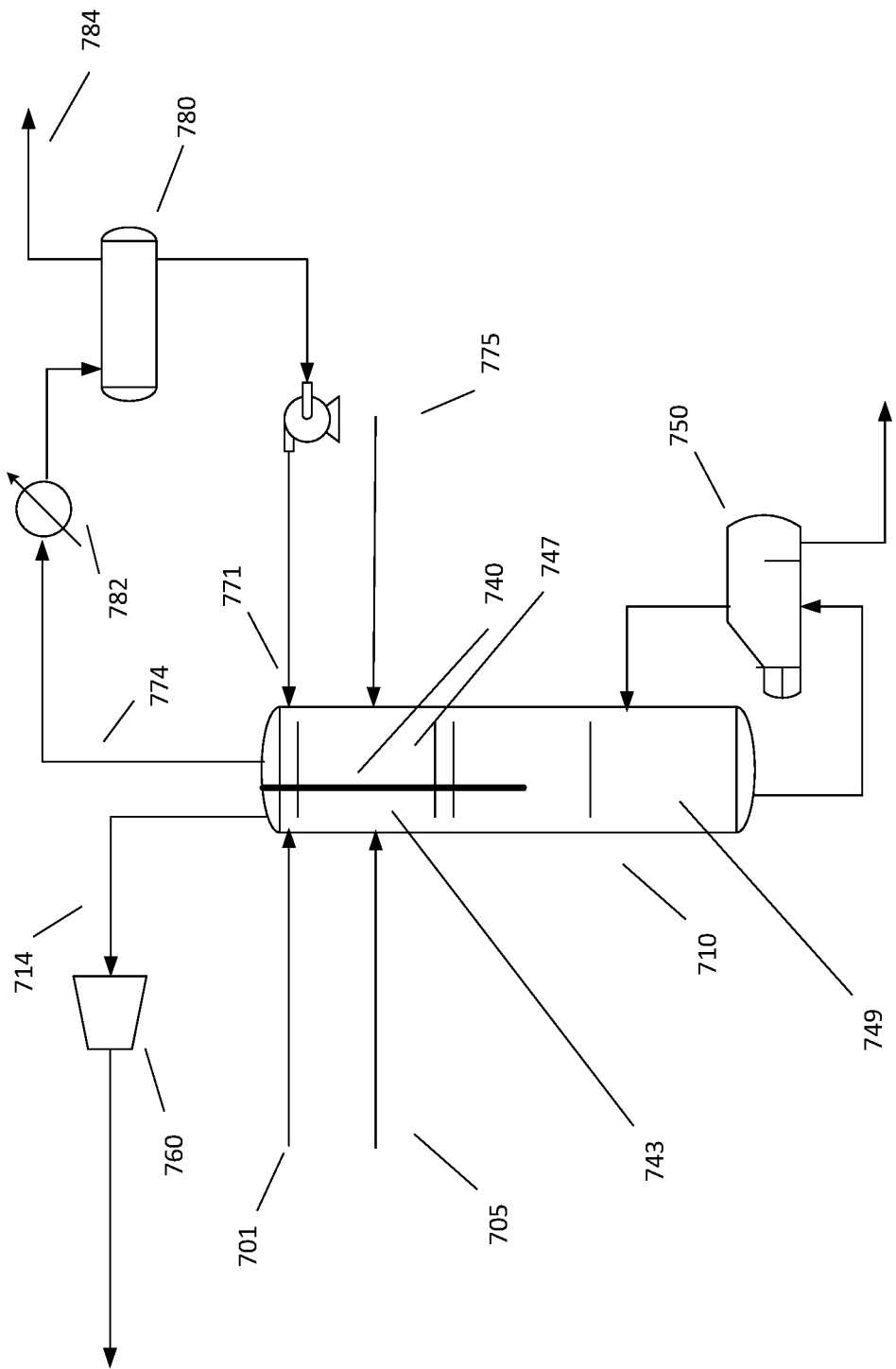
FIG. 7 shows another example of a configuration for forming a compressed $H_2S$ stream from the overhead gas of an amine stripping vessel using a top divided wall configuration.

The configurations in FIGS. 1-5 all involve using a hydrogen-containing gas as a stripping medium fir a rich amine. Still other options for incorporating $H_2S$ into a hydrogen-containing gas can involve separately stripping a rich amine using a stripping gas such as steam, and then compressing the resulting stripped $H_2S$ so that the $H_2S$ can be added to a hydrogen-containing stream prior to introduction into a hydroprocessing stage. FIGS. 6 and 7 show examples of this type of configuration.

In FIG. 6, a stripping tower or vessel 610 can be used that includes a water wash 601 and a rich amine stream 605 (that contains $H_2S$) as inputs. The stripping tower has an associated reboiler 650. During operation, reboiler 650 can generate steam that travels up in the stripping vessel 610. The reboiler also generates a lean amine stream 653 that can then be used in an amine absorber. The steam from reboiler 650 provides a counter-current flow for contact with water wash 601 and rich amine stream 605. The steam provides energy for desorption of $H_2S$ from the rich amine stream. The portion of the steam that does not condense while traveling up through stripping vessel 610 can exit as part of overhead stream 614, along with any $H_2S$ desorbed from the rich amine stream. The resulting overhead stream 664 can then be compressed 660 to allow the $H_2S$ to be combined with a hydrogen-containing stream and/or to allow the $H_2S$ to be introduced directly into a reactor that is part of a hydroprocessing stage that performs hydrodeoxygenation. Optionally, prior to and/or after compression 660, water can be removed from overhead stream 614.

FIG. 7 shows an example of how a top dividing wall can allow a single stripping vessel to be used for generation of both sweetened hydrogen and a compressed $H_2S$ stream for addition to a hydroprocessing stage that performs hydrodeoxygenation. In FIG. 7, stripping tower or vessel 710 includes a dividing wall 740. This creates a first region 743 and a second region 747 on either side of the dividing wall, along with a common volume 749 below the bottom of the dividing wall. Optionally, an alternative to the configuration in FIG. 7 could be to have a dividing wall that extends the full height (not shown) of the stripping vessel 710. This would require other changes in flows similar to the changes described in connection with changing from a configuration similar to FIG. 3 to a configuration similar to FIG. 4.

In the configuration shown in FIG. 7, water wash 701 and a first rich amine stream 705 are introduced into first region 743 of stripping vessel 710. First rich amine stream 705 corresponds to a rich amine stream from a part of the refinery different from the hydroprocessing stage that performs hydrodeoxygenation, so that first rich amine stream 705 corresponds to a stream that includes adsorbed $H_2S$. A second rich amine stream 775 and a reflux 771 are introduced into second region 747 of stripping vessel 710. The second rich amine stream 775 can correspond to, for example, the acid gas rich amine stream formed by the absorption of acid gases from a hydrogen-containing stream that is separated from the effluent of the hydroprocessing stage that performs hydrodeoxygenation.

During operation, reboiler 750 can generate steam that passes through common region 749 and passes into both first region 743 and second region 747. This can allow for stripping of both first rich amine stream 705 and second rich amine stream 775. The dividing wall 740 allows the two different stripping products to for separate overhead streams 714 and 774. Overhead stream 714 can correspond to an overhead stream that contains $H_2S$. Overhead stream 714 can then be compressed 760 to allow the $H_2S$ to be combined with a hydrogen-containing stream and/or to allow the $H_2S$ to be introduced directly into a reactor that is part of a hydroprocessing stage that performs hydrodeoxygenation. Optionally, prior to and/or after compression 760, water can be removed from overhead stream 714. Overhead stream 774 can correspond to an overhead stream that includes $H_2S$ and $CO_2$. Overhead stream 774 can be cooled 782 prior to passing into a gas-liquid separator 780 for separation of water (reflux) 771 from a remaining $H_2S$ and $CO_2$-containing stream 784.

Feedstock for Hydrodeoxygenation

In various aspects, a feedstock for hydrodeoxygenation can correspond to a feed derived from a biological source. In this discussion, a feed derived from a biological source refers to a feedstock derived from a biological raw material component, such as vegetable fats/oils or animal fats/oils, fish oils, pyrolysis oils, and algae lipids/oils, as well as components of such materials, and in some embodiments can specifically include one or more types of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof.

Examples of vegetable oils that can be used in accordance with this invention include, but are not limited to rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil and rice bran oil.

Algae oils or lipids can typically be contained in algae in the form of membrane components, storage products, and/or metabolites. Certain algal strains, particularly microalgae such as diatoms and cyanobacteria, can contain proportionally high levels of lipids. Algal sources for the algae oils can contain varying amounts, e.g., from 2 wt % to 40 wt % of lipids, based on total weight of the biomass itself.

Vegetable fats/oils, animal fats/oils, fish oils, pyrolysis oils, and/or algae lipds/oils as referred to herein can also include processed material. Non-limiting examples of processed vegetable, animal (including fish), and algae material include fatty acids and fatty acid alkyl esters. Alkyl esters typically include $C_1$-$C_5$ alkyl esters of fatty acids. One or more of methyl, ethyl, and propyl esters are preferred.

Other bio-derived feeds usable in the present invention can include any of those which comprise primarily triglycerides and free fatty acids (FFAs). The triglycerides and FFAs typically contain aliphatic hydrocarbon chains in their structure having from 8 to 36 carbons, preferably from 10 to 26 carbons, for example from 10 to 22 carbons or 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the triglyceride present in the lipid material can be comprised of $C_{10}$ to $C_{26}$ fatty acid constituents, based on total triglyceride present in the lipid material. Further, a triglyceride is a molecule having a structure corresponding to a reaction product of glycerol and three fatty acids. Although a triglyceride is described herein as having side chains corresponding to fatty acids, it should be understood that the fatty acid component does not necessarily contain a carboxylic acid hydrogen. Other types of feed that are derived from biological raw material components can include fatty acid esters, such as fatty acid alkyl esters (e.g., FAME and/or FAEE).

A feed derived from a biological source can have a wide range of nitrogen and/or sulfur contents. For example, a feedstock based on a vegetable oil source can contain up to 300 wppm nitrogen. In contrast, a biomass based feedstream containing whole or ruptured algae can sometimes include a higher nitrogen content. Depending on the type of algae, the nitrogen content of an algae based feedstream can be at least 2 wt %, for example at least 3 wt %, at least 5 wt %, such as up to 10 wt % or possibly still higher. The sulfur content of a feed derived from a biological source can also vary. In some aspects, the sulfur content can be 500 wppm or less, or 200 wppm or less, or 100 wppm or less, or 50 wppm or less, such as down to being substantially free of sulfur (1.0 wppm or less).

Aside from nitrogen and sulfur, oxygen can be another heteroatom component in feeds derived from a biological source. For example, a feed derived from a biological source, prior to hydrotreatment, can include 1.0 wt % to 20 wt % of oxygen, or 1.0 wt % to 15 Wt %, or 1.0 wt % to 10 wt %, or 3.0 wt % to 20 wt %, or 3.0 wt % to 15 wt %, or 3.0 wt % to 10 wt %, or 4.0 wt % to 15 wt %, or 4.0 wt % to 12 wt %.

In some aspects, a portion of a mineral feedstock can be co-processed with a feed derived from a biological source. A mineral feedstock refers to a conventional feedstock, typically derived from crude oil and that has optionally been subjected to one or more separation and/or other refining processes. In one preferred embodiment, the mineral feedstock can be a petroleum feedstock boiling in the diesel range or above. Examples of suitable feedstocks can include, but are not limited to, virgin distillates, hydrotreated virgin distillates, kerosene, diesel boiling range feeds (such as hydrotreated diesel boiling range feeds), light cycle oils, atmospheric gasoils, and the like, and combinations thereof.

The amount of fresh mineral feedstock blended with a feed derived from a biological source can correspond to 1.0 wt % to 50 wt % of the weight of the blended feedstock, or 1.0 wt % to 30 wt %, or 1.0 wt % to 20 wt %, or 10 wt % to 50 wt %, or 10 wt % to 30 wt %. Additionally or alternately, the amount of mineral feedstock blended with the bio-derived feed can be low enough so that the resulting blended or combined feed has a sulfur content of 1000 wppm or less, or 500 wppm or less, or 200 wppm or less. In various aspects, the amount of fresh bio-derived feed can correspond to 30 wt % to 99 wt % of the blended feedstock, or 50 wt % to 99 wt %, or 70 wt % to 99 wt %, or 30 wt % to 75 wt %. It is noted that the blended feedstock can optionally include a recycle portion.

Mineral feedstocks for blending with a bio-derived can be relatively free of nitrogen (such as a previously hydrotreated feedstock) or can have a nitrogen content from about 1 wppm to about 2000 wppm nitrogen, for example from about 50 wppm to about 1500 wppm or from about 75 to about 1000 wppm. In some embodiments, the mineral feedstock can have a sulfur content from about 1 wppm to about 10,000 wppm sulfur, for example from about 10 wppm to about 5,000 wppm or from about 100 wppm to about 2,500 wppm. However, in various aspects, such mineral feedstocks can be combined with a bio-derived feed (and/or other feeds) so that the resulting combined feed has a sulfur content of 2000 wppm or less, or 1000 wppm or less, or 500 wppm or less, or 300 wppm or less, or 10 wppm or less, such as down to having substantially no sulfur content within detection limit (roughly 0 wppm). Additionally or alternately, the combined feed can have an oxygen content of 1.0 wt % or more, such as 1.0 wt % to 15 wt %.

The content of sulfur, nitrogen, oxygen, and olefins in a feedstock created by blending two or more feedstocks can typically be determined using a weighted average based on the blended feeds. For example, a mineral feed and a bio-derived feed can be blended in a ratio of 20 wt % mineral feed and 80 wt % bio-derived feed. If the mineral feed has a sulfur content of about 1000 wppm, and the bio-derived feed has a sulfur content of about 10 wppm, the resulting blended feed could be expected to have a sulfur content of about 208 wppm.

Hydroprocessing Stage that Performs Hydrodeoxygenation

In various aspects, a feed having a low sulfur content and an oxygen content of 1.0 wt % or more can be exposed to hydroprocessing conditions in a hydroprocessing stage. The low sulfur content can correspond to a sulfur content of 2000 wppm or less, or 1000 wppm or less, or 500 wppm or less, or 300 wppm or less, or 10 wppm or less, such as down to having substantially no sulfur content within detection limit (roughly 0 wppm). A hydroprocessing stage can include one or more reactors, with each reactor optionally including one or more catalyst beds. The catalyst beds within a reactor can include similar catalysts or different catalysts, depending on the configuration. Exposing a feed having a low sulfur content and an oxygen content of 1.0 wt % or more to hydroprocessing conditions can result in hydrodeoxygenation of the feed.

As an example, in some aspects a hydroprocessing stage can correspond to a stage for conversion of a feed including a substantial portion of vegetable oil into a renewable diesel fuel or fuel blending product. Such a feed can include 40 wt % or more of a bio-oil, or 60 wt % or more, or 80 wt % or more, such as up to being substantially composed of a bio-oil (99 wt % or more). Some types of bio-oil can correspond to soybean oil, canola oil, and/or other types of oils corresponding to a primary bio-oil product. In such aspects, the bio-oil can optionally have a triglyceride content of 40 wt % or more, or 60 wt % or more, or 80 wt % or more, such as up to being substantially composed of triglycerides. Other types of bio-oils can correspond to oils such as the corn oil that is formed as a secondary product during ethanol production from corn biomass.

In this type of example, a hydroprocessing stage for conversion of vegetable oil into renewable diesel can involve two types of hydroprocessing. A first type of hydroprocessing can correspond to hydrodeoxygenation of the feed. After hydrodeoxygenation, additional cracking and/or catalytic dewaxing can be performed on the hydrodeoxygenated feed to improve one or more properties of the final fuel or fuel blending product. It is noted that both hydrodeoxygenation and the additional cracking and/or catalytic dewaxing can occur at the same time. However, due to the relatively rapid rate for hydrodeoxygenation under conditions suitable for cracking and/or dewaxing, at least a portion of the cracking and/or catalytic dewaxing can typically occur after hydrodeoxygenation has been substantially completed.

Some examples of hydrodeoxygenation catalysts can correspond to hydrotreating catalysts. In some aspects, a catalyst can be used that includes a Group 6 metal on a support material, but less than 1.0 wt % of a Group 8 metal. In other aspects, conventional hydrotreating catalysts that include both a Group 6 metal and a Group 8 metal on a support material can be used. The at least one Group 6 metal, in oxide form, can typically be present in an amount ranging from 2.0 wt % to 40 wt %, relative to a total weight of the catalyst, or 6.0 wt % to 40 wt %, or 10 wt % to 30 wt %. When a Group 8-10 metal is also present, the at least one Group 8-10 metal, in oxide form, can typically be present in an amount ranging from 2.0 wt % to 40 wt %, preferably for supported catalysts from 2.0 wt % to 20 wt % or from 4.0 wt % to 15 wt %.

The hydroprocessing catalyst can be provided in a reactor in one or more catalyst beds. For example, a convenient bed length in some reactors is a bed length of about 25 feet to 30 feet. Such a bed length reduces difficulties in a catalyst bed associated with poor flow patterns. Due to the heat release from the initial bed during olefin saturation and deoxygenation, it may be desirable to use a shorter catalyst bed as the initial bed, such as having a bed length of 10 feet to 25 feet.

Typical effective conditions for processing a feedstock containing triglycerides, fatty acid alkyl esters, fatty acids, and/or fatty acid derivatives (and/or other oxygen-containing bio-derived feeds) to remove oxygen can include a hydrogen partial pressure of 200 psig (1.4 MPag) to 1200 psig (8.3 MPag).

The hydrotreating conditions can also include a temperature, a hydrogen treat gas rate, and a liquid hourly space velocity (LHSV). Suitable effective temperatures can be from 230° C. to 375° C., or 250° C. to 350° C. The LHSV can be from 0.1 hr$^{-1}$ to 10 hr$^{-1}$, or from 0.2 hr$^{-1}$ to 5.0 hr$^{-1}$. The hydrogen treat gas rate can be any convenient value that provides sufficient hydrogen tier deoxygenation of a feedstock. Typical values can range from 2000 scf/B (~340 Nm$^3$/m$^3$) to 20,000 scf/B (~3400 Nm$^3$/m$^3$), or 5000 scf/B (~840 Nm$^3$/m$^3$) to 20,000 scf/B (~3400 Nm$^3$/m$^3$), or 8000 scf/B (~1350 Nm$^3$/m$^3$) to 20,000 scf/B (~3400 Nm$^3$/m$^3$) or possibly still higher. It is noted that the hydrogen consumption for fresh bio-derived feed can approach 2000 scf/B (~340 Nm$^3$/m$^3$) or still higher values. One option for selecting a treat gas rate can be to select a rate based on the expected stoichiometric amount of hydrogen for complete deoxygenation and olefin saturation of the feedstock. In some aspects, the hydrogen treat gas rate can be selected based on a multiple of the stoichiometric hydrogen need, such as at least 1 times the hydrogen need, or at least 1.5 times the hydrogen need, or at least 2 times the hydrogen need, or 4 times the hydrogen need, such as up to 10 times the hydrogen need or possibly still higher. In other aspects where at least a portion of the gas phase deoxygenation effluent is recycled, any convenient amount of hydrogen relative to the stoichiometric need can be used. In various aspects, the hydrogen treat gas can be an H$_2$S-enriched hydrogen treat gas as described herein with an H$_2$S content of 50 vppm to 10,000 vppm.

The hydrotreating conditions for can be suitable for reducing the oxygen content of the feed to 1.0 wt % or less, or 0.5 wt % or less, such as down to having substantially no oxygen (0.1 wt % or less). Although the stoichiometric hydrogen need is calculated based on complete deoxygenation, reducing the oxygen content to substantially zero is typically not required to allow further processing of the deoxygenated feed in conventional equipment.

In some aspects, the hydrodeoxygenated effluent (or at least a portion thereof) can then be catalytically dewaxed in order to improve the cold flow properties of the distillate boiling range portion of the effluent. Fatty acid carbon chains often correspond to unbranched carbon chains. After deoxygenation, such unbranched carbon chains can often have relatively poor cold flow properties, such as relatively high pour points, cloud points, or cold filter plugging points. In applications where it is desired to use the distillate boiling range portion of the effluent as part of a diesel fuel, it can be desirable to expose a distillate boiling range product to a dewaxing catalyst under dewaxing conditions in order to improve the cold flow properties.

Dewaxing catalysts can include molecular sieves such as crystalline aluminosilicates (zeolites). More generally, dewaxing catalysts can correspond to catalysts having a zeotype framework. The dewaxing catalyst can optionally be a supported catalyst, such as a catalyst including a zeotype framework and a binder material. In an embodiment, the zeotype framework can comprise, consist essentially of, or be ZSM-5, ZSM-22, ZSM-23, ZSM-35, ISM-48, zeolite Beta, or a combination thereof, for example ZSM-23 and/or ZSM-48, or ZSM-48 and/or zeolite Beta. Optionally but preferably, zeotype frameworks that are selective for dewaxing by isomerization as opposed to cracking can be used, such as ZSM-48, zeolite Beta, ZSM-23, or a combination thereof. Additionally or alternately, the zeotype framework can comprise, consist essentially of, or be a 10-member ring 1-D zeotype framework. Optionally but preferably, the dewaxing catalyst can include a binder for the zeotype framework, such as alumina, titania, silica, silica-alumina, zirconia, or a combination thereof, for example alumina and/or titania or silica and/or zirconia and/or titania.

Aside from the zeotype framework(s) and optional binder, the dewaxing catalyst can also include at least one metal hydrogenation component, such as a Group 8-10 metal. Suitable Group 8-10 metals can include, but are not limited to, Pt, Pd, Ni, or a combination thereof. When a metal hydrogenation component is present, the dewaxing catalyst can include 0.1 wt % to 10 wt % of the Group 8-10 metal, or 0.1 wt % to 5.0 wt %, or 0.5 wt % to 10 wt %, or 0.5 wt % to 5.0 wt %, or 1.0 wt % to 10 wt %, or 1.0 wt % to 5.0 wt %.

In some aspects, the dewaxing catalyst can include an additional Group 6 metal hydrogenation component, such as W and/or Mo. In such aspects, when a Group 6 metal is present, the dewaxing catalyst can include 0.5 wt % to 20 wt % of the Group 6 metal, or 0.5 wt % to 10 wt %, or 2.5 wt % to 20 wt %, or 2.5 wt % to 10 wt %. As one example, the dewaxing catalyst can include 0.1 wt % to 5.0 wt % Pt and/or Pd as the hydrogenation metal component. As another example, the dewaxing catalyst can include as the hydrogenation metal components Ni and W, Ni and Mo, or Ni and a combination of W and Mo.

Catalytic dewaxing can be performed by exposing a feedstock to a dewaxing catalyst under effective (catalytic) dewaxing conditions. Dewaxing conditions can include temperatures of 550° F. (288° C.) to 840° F. (449° C.), hydrogen partial pressures of from 250 psig to 5000 psig (1.8 MPag to 34.6 MPag), and hydrogen treat gas rates of from 34 Nm$^3$/m$^3$ to 1700 sm$^3$/m$^3$ (~200 SCF/B to ~10,000 SCF/B). The liquid hourly space velocity (LHSV) of the feed relative to the dewaxing catalyst can be characterized can be from about 0.1 hr$^1$ to about 10 hr$^{-1}$.

Additionally or alternately, the hydrodeoxygenated feed can be exposed to conditions suitable for additional mild cracking of the hydrodeoxygenated feed. This can be performed, for example, in the presence of a conventional hydrotreating catalyst, aromatic saturation catalyst, and/or hydrocracking catalyst.

Example—Hydrogen Stripping of Rich Amine Stream

The stripping of a rich amine stream using hydrogen was modeled using ProMax® software. A configuration similar to the configuration shown in FIG. 5 was used to model the stripping process. For the model calculations, Table 1 shows the composition of the rich amine stream that was used. The amine used for the modeled rich amine stream was monoethanolamine (MEA).

TABLE 1

Composition of Rich Amine Stream

| Component | Mole % |
| --- | --- |
| $H_2S$ | 3 |
| $CO_2$ | 0.05 |
| $H_2$ | 0.01 |
| $CH_4$ | Trace |
| $C_2H_6$ | Trace |
| MEA | 6.6 |
| $H_2O$ | 90.34 |
| $NH_3$ | Trace |

In the model, pure hydrogen was used as the stripping medium. Water wash trays were included to prevent amine carryover into the overhead gas. Table 2 shows the composition (in mol %) of the various streams in the model of the amine stripping tower at steady state. The temperature of the rich amine stream was 120° F. (~49° C.). The temperature of the stripping gas prior to contacting the rich amine stream was 130° F. (~54° C.). The model included a rich amine flow rate of roughly 6 gallons per minute, in order to provide sufficient $H_2S$ for treating a fresh feedstock flow of roughly 10,000 barrels per day.

TABLE 2

Model Stream Compositions from $H_2$ Stripping of Rich Amine

| Stream Composition (Mol %) | Rich Amine | Makeup $H_2$ | Water Wash | $H_2S$-enriched $H_2$ | Stripped Amine |
| --- | --- | --- | --- | --- | --- |
| $H_2S$ | 3.0 | 0 | 0 | 0.14 | 0.47 |
| $CO_2$ | 0.05 | 0 | 0 | 0.00032 | 0.027 |
| $H_2$ | 0.01 | 100 | 0 | 99.15 | 0.072 |
| $CH_4$ | 0 | 0 | 0 | 0 | 0 |
| $C_2H_6$ | 0 | 0 | 0 | 0 | 0 |
| MEA | 6.6 | 0 | 0 | 0 | 3.98 |
| $H_2O$ | 90.34 | 0 | 100 | 0.71 | 95.45 |

As shown in Table 2, using $H_2$ as a stripping gas allowed for formation of an $H_2S$-enriched hydrogen stream that included 0.14 mol % (or roughly 0.14 vol %) of $H_2S$. The stripping also reduced the molar ratio of $H_2S$ to MEA from 0.45 (in the rich amine stream) to 0.12 (in the stripped amine stream).

Additional Embodiments

Embodiment 1. A method for performing hydrodeoxygenation, comprising:
stripping an amine-containing flow comprising a first molar ratio of $H_2S$ to amine of 0.25 or more with a stripping gas comprising 80 vol % or more of $H_2$ in a vessel to form an amine-containing flow comprising a second molar ratio of $H_2S$ to amine that is lower than the first molar ratio and a gas phase fraction comprising 80 vol % or more $H_2$ and 50 vppm or more of $H_2S$; exposing a feedstock comprising at least a fresh feed portion to a sulfided hydroprocessing catalyst and a treat gas comprising at least a portion of the gas phase fraction under hydrodeoxygenation conditions to form a liquid product effluent comprising 0.5 wt % or less of oxygen and a gas product effluent comprising 100 vppm or more of $H_2S$, the fresh feed portion comprising 1000 wppm or less of sulfur and 1.0 wt % or more of oxygen, the hydrodeoxygenation conditions comprising a flow of treat gas relative to a flow rate of the fresh feed of 500 SCF/bbl or higher (~1350 Nm$^3$/m$^3$).

Embodiment 2. A method for performing hydrodeoxygenation, comprising: stripping an amine-containing flow comprising a first molar ratio of H$_2$S to amine of 0.25 or more with a stripping gas comprising steam in a vessel to form an amine-containing flow comprising a second molar ratio of H$_2$S to amine that is lower than the first molar ratio and a gas phase fraction comprising H$_2$S; compressing at least a portion of the gas phase fraction comprising H$_2$S to form a compressed H$_2$S fraction, the compressed H$_2$S fraction comprising 1.0 vol % or more H$_2$S; and exposing a feedstock comprising at least a fresh feed portion to a sulfided hydroprocessing catalyst and a treat gas comprising at least a portion of the compressed H$_2$S fraction under hydrodeoxygenation conditions to form a liquid product effluent comprising 0.5 wt % or less of oxygen and a gas product effluent comprising 100 vppm or more of H$_2$S, the fresh feed portion comprising 1.0 wt % or more of oxygen, the hydrodeoxygenation conditions comprising a flow of treat gas relative to a flow rate of the fresh feed of 5000 SCF/bbl or higher (~1350 Nin$^3$/m$^3$), the treat gas comprising 80 vol % or more of H$_2$ and 50 vppm or more of H$_2$S.

Embodiment 3. The method of any of the above embodiments, wherein the fresh feed portion comprises 1000 wppm or less of sulfur.

Embodiment 4. The method of any of the above embodiments, wherein the vessel comprises a dividing wall defining at least a first volume and a second volume within the vessel.

Embodiment 5. The method of Embodiment 4, wherein the amine-containing flow comprising the first molar ratio of H$_2$S to amine is introduced into the first volume, and wherein a second amine-containing flow is introduced into the second volume, the method optionally further comprising exposing at least a portion of the gas product effluent to an amine-containing stream in an amine absorber to form the second amine-containing flow.

Embodiment 6. The method of Embodiment 4 or 5, wherein the dividing wall comprises a height that is less than an interior height of the vessel, the dividing wall further defining a common volume within the vessel.

Embodiment 7. The method of any of the above embodiments, wherein the sulfided hydroprocessing catalyst comprises a hydrotreating catalyst, a dewaxing catalyst, a hydrocracking catalyst, an aromatic saturation catalyst, or a combination thereof.

Embodiment 8. The method of any of the above embodiments, wherein the fresh feed portion comprises 50 wt % or more of a bio-derived fraction, or wherein the feedstock comprises 0.1 wt % to 50 wt % of a mineral feedstock, or a combination thereof.

Embodiment 9. The method of any of the above embodiments, wherein the gas product effluent comprises an H$_2$ content of 75 vol % or more and a CO$_2$ content of 1.0 vol % to 20 vol %.

Embodiment 10. The method of any of the above embodiments, wherein the treat gas comprises 100 vppm or more of H$_2$S and 0.5 vol % or less of CO$_2$.

Embodiment 11. The method of any of the above embodiments, further comprising separating the liquid product effluent to form at least a recycle portion, the feedstock further comprising the recycle portion.

Embodiment 12. The method of any of the above embodiments, wherein the fresh feed portion comprises 80 wt % or more of a bio-derived fraction.

Embodiment 13. The method of any of the above embodiments, further comprising: stripping a third amine-containing flow comprising a third molar ratio of H$_2$S to amine of 0.25 or more with a stripping gas comprising 80 vol % or more of H$_2$ in a vessel to form an amine-containing flow comprising a fourth molar ratio of H$_2$S to amine that is lower than the third molar ratio and a sulfidation gas phase fraction comprising 80 vol % or more H$_2$ and 1.0 vol % or more of H$_2$S; and exposing a hydroprocessing catalyst to sulfidation treat gas comprising at least a portion of the sulfidation gas phase fraction under sulfidation conditions to form the sulfided hydroprocessing catalyst.

Embodiment 14. The method of any of the above embodiments, wherein the fresh feed portion comprises a non-hydrotreated feed portion.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method for performing hydrodeoxygenation, comprising:
stripping an amine-containing flow comprising a first molar ratio of H$_2$S to amine of 0.25 or more with a stripping gas comprising 80 vol % or more of H$_2$ in a vessel to form an amine-containing flow comprising a second molar ratio of H$_2$S to amine that is lower than the first molar ratio and a gas phase fraction comprising 80 vol % or more H$_2$ and 50 vppm or more of H$_2$S;
exposing, within a hydroprocessing reactor, a feedstock comprising at least a fresh feed portion to a sulfided hydroprocessing catalyst and a treat gas comprising at least a portion of the gas phase fraction under hydrodeoxygenation conditions to form a liquid product effluent comprising 0.5 wt % or less of oxygen and a gas product effluent comprising 100 vppm or more of H$_2$S, the fresh feed portion comprising 1.0 wt % or more of oxygen, the hydrodeoxygenation conditions comprising a flow of treat gas relative to a flow rate of the fresh feed of 5000 SCF/bbl or higher (~1350 Nm$^3$/m$^3$), wherein the fresh feed portion corresponds to feedstock that has not been recycled from downstream of the hydroprocessing reactor.

2. The method of claim 1, wherein the fresh feed portion comprises a non-hydrotreated feed portion, or wherein the fresh feed portion comprises 1000 wppm or less of sulfur, or a combination thereof.

3. The method of claim 1, wherein the vessel comprises a dividing wall defining at least a first volume and a second volume within the vessel.

4. The method of claim 3, wherein the amine-containing flow comprising the first molar ratio of H$_2$S to amine is introduced into the first volume, and wherein a second amine-containing flow is introduced into the second volume.

5. The method of claim 4, further comprising exposing at least a portion of the gas product effluent to an amine-containing stream in an amine absorber to form the second amine-containing flow.

6. The method of claim 3, wherein the dividing wall comprises a height that is less than an interior height of the vessel, the dividing wall further defining a third volume within the vessel, wherein the third volume is in fluid communication with the first volume and the second volume.

7. The method of claim 1, wherein the sulfided hydroprocessing catalyst comprises a hydrotreating catalyst, a dewaxing catalyst, a hydrocracking catalyst, an aromatic saturation catalyst, or a combination thereof.

8. The method of claim 1, wherein the fresh feed portion comprises 50 wt % or more of a bio-derived fraction, or wherein the feedstock comprises 0.1 wt % to 50 wt % of a mineral feedstock, or a combination thereof.

9. The method of claim 1, wherein the gas product effluent comprises an $H_2$ content of 75 vol % or more and a $CO_2$ content of 1.0 vol % to 20 vol %.

10. The method of claim 1, wherein the treat gas comprises 100 vppm or more of $H_2S$ and 0.5 vol % or less of $CO_2$.

11. The method of claim 1, further comprising separating the liquid product effluent to form at least a recycle portion, the feedstock further comprising the recycle portion.

12. A method for performing hydrodeoxygenation, comprising:
stripping an amine-containing flow comprising a first molar ratio of $H_2S$ to amine of 0.25 or more with a stripping gas comprising steam in a vessel to form an amine-containing flow comprising a second molar ratio of $H_2S$ to amine that is lower than the first molar ratio and a gas phase fraction comprising $H_2S$;
compressing at least a portion of the gas phase fraction comprising $H_2S$ to form a compressed $H_2S$ fraction, the compressed $H_2S$ fraction comprising 1.0 vol % or more $H_2S$; and
exposing, within a hydroprocessing reactor, a feedstock comprising at least a fresh feed portion to a sulfided hydroprocessing catalyst and a treat gas comprising at least a portion of the compressed $H_2S$ fraction under hydrodeoxygenation conditions to form a liquid product effluent comprising 0.5 wt % or less of oxygen and a gas product effluent comprising 100 vppm or more of $H_2S$, the fresh feed portion comprising 1.0 wt % or more of oxygen, the hydrodeoxygenation conditions comprising a flow of treat gas relative to a flow rate of the fresh feed of 5000 SCF/bbl or higher (~1350 $Nm^3/m^3$), the treat gas comprising 80 vol % or more of $H_2$ and 50 vppm or more of $H_2S$, wherein the fresh feed portion corresponds to feedstock that has not been recycled from downstream of the hydroprocessing reactor.

13. The method of claim 12, wherein the vessel comprises a dividing wall defining at least a first volume and a second volume within the vessel.

14. The method of claim 12, wherein the dividing wall comprises a height that is less than an interior height of the vessel, the dividing wall further defining a third volume within the vessel, wherein the third volume is in fluid communication with the first volume and the second volume.

15. The method of claim 12, wherein the fresh feed portion comprises 1000 wppm or less of sulfur.

16. The method of claim 12, wherein the fresh feed portion comprises 80 wt % or more of a bio-derived fraction, or wherein the feedstock comprises 0.1 wt % to 20 wt % of a mineral feedstock, or a combination thereof.

17. The method of claim 12, wherein the treat gas comprises 100 vppm or more of $H_2S$ and 0.5 vol % or less of $CO_2$.

18. The method of claim 2, further comprising separating the liquid product effluent to form at least a recycle portion, the feedstock further comprising the recycle portion.

19. A method for performing hydrodeoxygenation, comprising:
stripping a first amine-containing flow comprising a first molar ratio of $H_2S$ to amine of 0.25 or more with a stripping gas comprising 80 vol % or more of $H_2$ in a vessel to form an amine-containing flow comprising a second molar ratio of $H_2S$ to amine that is lower than the first molar ratio and a sulfidation gas phase fraction comprising 80 vol % or more H2 and 1.0 vol % or more of $H_2S$;
exposing a hydroprocessing catalyst to sulfidation treat gas comprising at least a portion of the sulfidation gas phase fraction under sulfidation conditions to form a sulfided hydroprocessing catalyst;
stripping a second amine-containing flow comprising a third molar ratio of $H_2S$ to amine of 0.25 or more with a stripping gas comprising 80 vol % or more of $H_2$ in a vessel to form an amine-containing flow comprising a fourth molar ratio of $H_2S$ to amine that is lower than the third molar ratio and a gas phase fraction comprising 80 vol % or more $H_2$ and 50 vppm or more of $H_2S$;
exposing, within a hydroprocessing reactor, a feedstock comprising at least a fresh feed portion to the sulfided hydroprocesing catalyst and a treat gas comprising at least a portion of the gas phase fraction under hydrodeoxygenation conditions to form a liquid product effluent comprising 0.5 wt % or less of oxygen and a gas product effluent comprising 200 vppm or more of $H_2S$, the fresh feed portion comprising 1000 wppm or less of sulfur and 1.0 wt % or more of oxygen, the hydrodeoxygenation conditions comprising a flow of treat gas relative to a flow rate of the fresh feed of 5000 SCF/bbl or higher (~1350 $Nm^3/m^3$), wherein the fresh feed portion corresponds to feedstock that has not been recycled from downstream of the hydroprocessing reactor.

20. The method of claim 19, wherein the fresh feed portion comprises 50 wt % or more of a bio-derived fraction, or wherein the feedstock comprises 0.1 wt % to 50 wt % of a mineral feedstock, or a combination thereof.

\* \* \* \* \*